United States Patent [19]

Bloomfield

[11] Patent Number: 5,079,752
[45] Date of Patent: Jan. 7, 1992

[54] PLATFORM MOUNTED ULTRASONIC SWEEP DETECTION SYSTEM

[75] Inventor: John W. Bloomfield, Hilton Head Island, S.C.

[73] Assignees: E.L.F. Limited Partnership, Hilton Head Island, S.C.; Samsung Electronics Co., Ltd., Suwon City, Rep. of Korea

[21] Appl. No.: 498,620

[22] Filed: Mar. 26, 1990

[51] Int. Cl.⁵ .............................. G01S 15/00
[52] U.S. Cl. ................................ 367/104; 367/138
[58] Field of Search ................ 367/104, 138, 12, 165, 367/173; 128/660.9, 662.03, 662.06; 73/633, 634, 618

[56] References Cited

U.S. PATENT DOCUMENTS 4,375,818 3/1983 Suwaki et al. ................ 128/662.06

Primary Examiner—Daniel T. Pihulic
Attorney, Agent, or Firm—Fleit, Jacobson, Cohn, Price, Holman & Stern

[57] ABSTRACT

Ultrasonic energy is emitted within a detection envelope from a single transducer and echoes of targets therein are received during scanning displacement of the transducer through a predetermined sweep angle from a zero position on a platform, against the centering bias of springs through which pulse signal current is conducted to and from the transducer. An electromagnetic scanner drive imparts oscillatory motion to the transducer by magnetic generation of displacing forces varied in accordance with its loading at the zero position of the transducer and at limit positions detected by a position sensor to maintain a constant scanning sweep angle in timed relation to pulsing of the transducer through a transmit-receive circuit under preprogrammed computer control.

24 Claims, 9 Drawing Sheets

PLATFORM MOUNTED ULTRASONIC SWEEP DETECTION SYSTEM

BACKGROUND OF THE INVENTION

This invention relates generally to sensors for remote object detection and avoidance, associated for example with robotic systems, mobile security and inspection platforms, decoys, etc.

Presently known object detection systems include an array of multiple ultrasonic sensors fixed to a mobile platform or vehicle body. Each sensor is pulsed or driven to emit ultrasonic energy within a detection zone and reflected ultrasonic echoes are recorded and analyzed through microcomputers interfaced with the respective sensors through multiplexer electronics. While such systems are effective and successful to some degree, they are expensive to implement. Additionally, relatively expensive multiplexer electronics must be utilized to coordinate signal paths for proper analysis of all incoming reflection signals and timing data. Accordingly, such ultrasonic remote object detection systems of the type involving plural sensors fixedly mounted on a platform are severely limited in application by cost so as to be confined to laboratory use for test purposes as distinguished from widespread use in practical applications.

Movable scanning types of ultrasonic sensors have also been proposed for remote object detection systems as disclosed for example in U.S. Pat. No. 4,805,155 to Shiraishi et al. According to the Shiraishi et al patent, a sensor assembly is rotated in one direction on its platform by 360° and consists of three separate transducer elements angularly spaced from each other by 120 degrees. In view of the noise generated as a result of the scanning displacement of the sensors associated with such systems, measures must be taken to compensate for noise signals injected into echo signals. The noise compensation measures, if successful to any acceptable degree, involve complex circuit modifications which sometimes render the movable scanning type sensor systems more costly than the platform fixed type of sensor systems aforementioned.

It is therefore an important object of the present invention to provide a low cost ultrasonic type of object detection system capable of performing its functions in a more effective, economical and reliable manner.

An additional object of the present invention in accordance with the foregoing object is to provide a remote object detection and avoidance system utilizing a movable scanning type of platform mounted ultrasonic sensor arrangement which avoids the noise problems and costly solutions usually associated therewith, which has heretofore limited application of such systems.

SUMMARY OF THE INVENTION

In accordance with the present invention, ultrasonic energy is emitted within a detection envelope from a single transducer for remote object detection purposes based on the principle of echo ranging wherein a powerful pulse of sonic energy of short duration is emitted and directed in certain directions by the transducer which then listens for echoes reflected from a target within the detection envelope to determine the distance, direction and nature of the target object so detected. Such echoes are received by the single transducer during scanning displacement thereof from a zero position on a platform, against the centering bias of springs which also act as conductors for pulse signal current flow between the transducer and a transmit-receive circuit. An electromagnetic scanner drive imparts oscillatory motion to the transducer for displacement thereof through a sweep angle arc of less than 360° according to one embodiment, by magnetically generated forces varied in accordance with the loading of the electromagnetic scanner drive at the zero position of the transducer and at sweep angle end positions as detected by a position sensor associated with the electromagnetic scanner drive. Such variation in the displacing forces is effected under programmed computer control in order to maintain a relatively constant sweep angle through which the transducer is displaced in proper timed relation to the pulsing of the transducer by the transmit-receive circuit for ultrasonic emission.

BRIEF DESCRIPTION OF DRAWING FIGURES

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF PREFERRED EMBODIMENT

Figure 1:
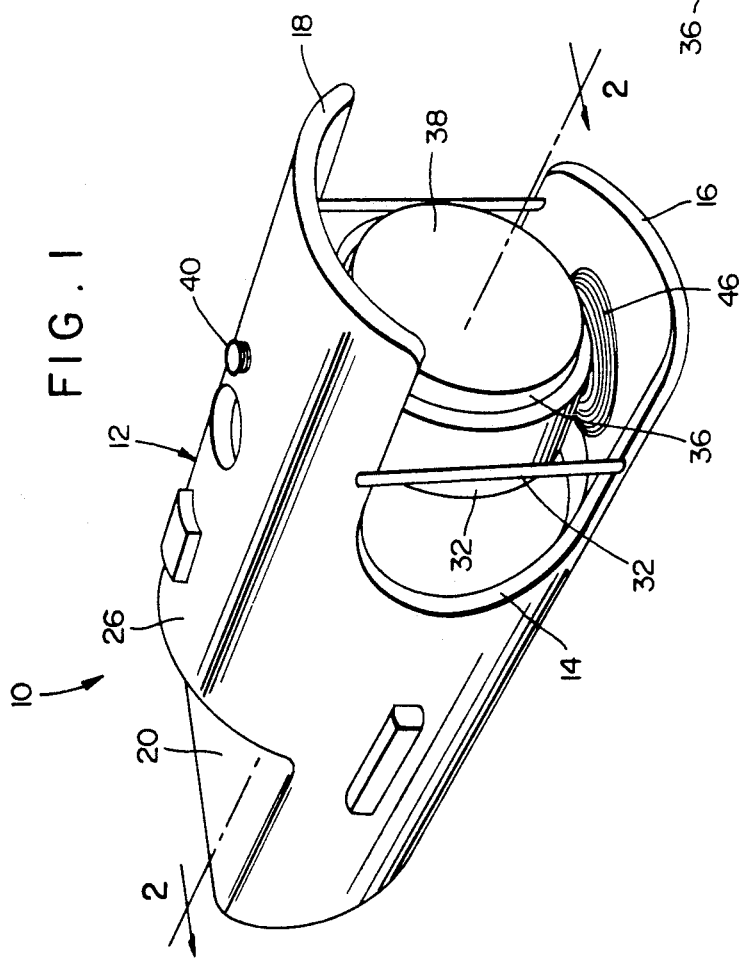
FIG. 1 is a perspective view showing a platform mounted ultrasonic transducer assembly constructed in accordance with one embodiment of the present invention.

Referring now to the drawings in detail, FIG. 1 illustrates an electro-acoustic transducer assembly generally referred to by reference numeral 10 which includes a tubular housing generally referred to by reference numeral 12 preferably made of a plastic material and adapted to be fixedly mounted on some platform body with which a remote object detection system is associated. The tubular housing 12 includes a pair of slot formations 14 extending longitudinally in 180 degree spaced relationship to each other, terminated at a front axial end of the housing by separate confronting arcuate end portions 16 and 18, with the end portion 18 extending longitudinally beyond the end portion 16.

Figure 3:
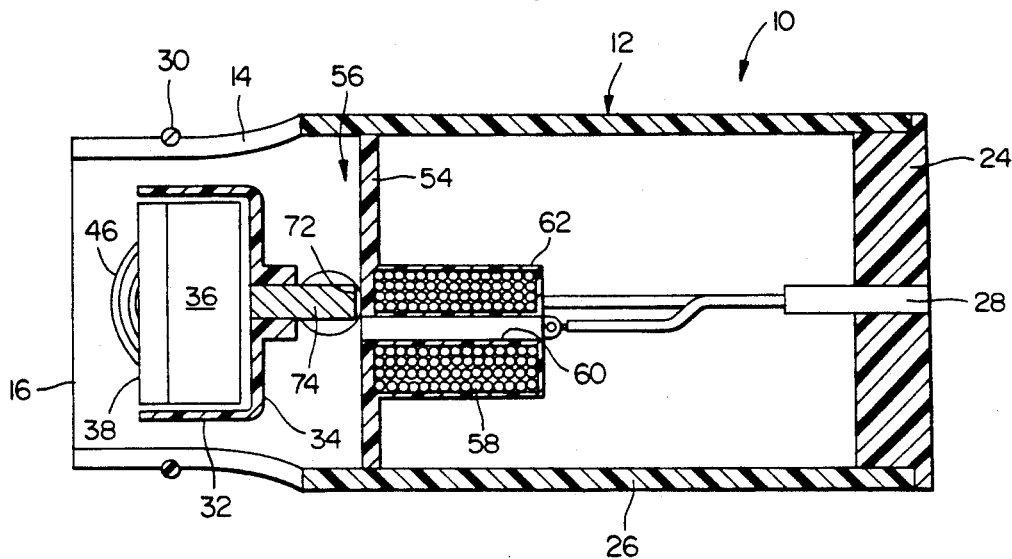
FIG. 3 is a section view taken substantially through a plane indicated by section line 3—3 in FIG. 2.
Figure 2:
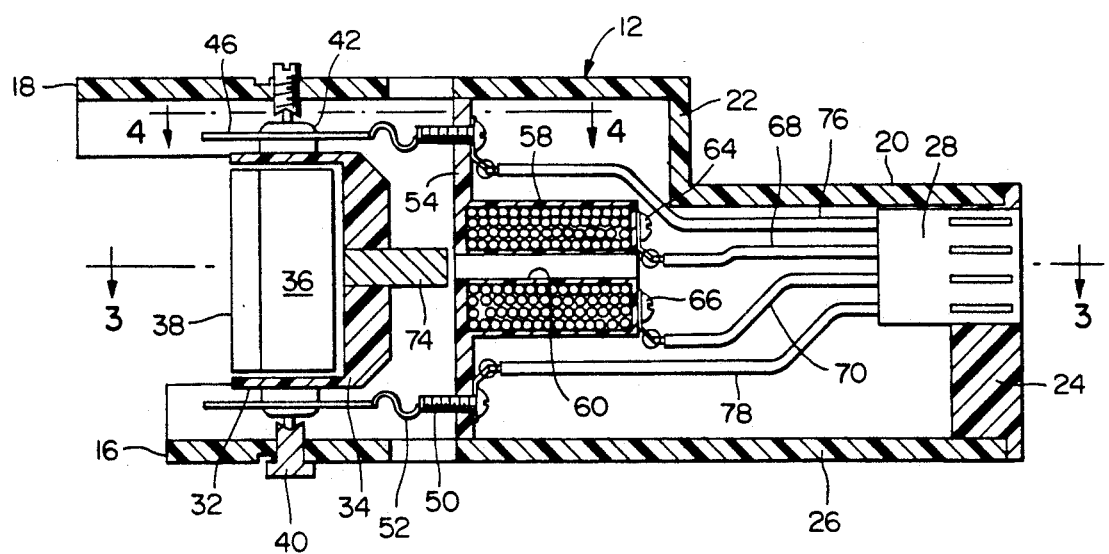
FIG. 2 is a longitudinal section view taken substantially through a plane indicated by section line 2—2 in FIG. 1.

The rear end portion of the tubular housing 12 opposite the front end is recessed to form a flat wall section 20 interconnected with the remainder of the tubular housing through a sector wall portion 22 as shown in FIG. 2. The rear end of the housing assembly as shown in FIGS. 2 and 3 is closed by a cover member 24 projecting into the housing assembly between the flat wall portion 20 and the generally tubular or cylindrical portion 26 of the housing assembly. A terminal connector plug 28 is mounted by the cover member 24 through which electrical conductor connections are established between the transducer assembly 10 and its control system as described in detail hereinafter.

The tubular housing 12 of the transducer assembly has a pair of stop elements in the form of rubber bands 30 anchored at opposite ends to the housing, bridging the slot formations 14 as more clearly seen in FIGS. 1 and 3. The slot formations expose lateral portions of a generally cylindrical transducer support member 32 having a rear end wall 34 as shown in FIGS. 2 and 3. An ultrasonic transducer element 36, of a well known construction, is fixedly mounted within the transducer support 32 with its energy emitting and receiving face 38 exposed through the opened front end of the tubular housing as shown. A pair of clock type bearing elements 40 are threadedly mounted by the tubular housing in alignment with each other to establish a rotational axis in perpendicular intersecting relationship to the longitudinal axis of the tubular housing 12. Bearing supported pintel elements 42 are fixed to the cylindrical transducer support 32 in bearing contact with the bearing elements 40 as shown in FIG. 2 so as to accommodate substantially frictionless angular displacement of the transducer element 36 about the rotational axis established by the bearing elements 40.

Figure 4:
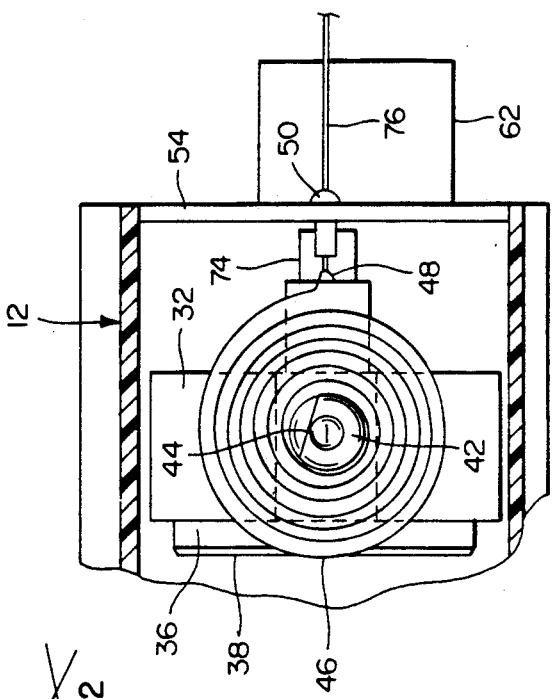
FIG. 4 is a partial section view taken substantially through a plane indicated by section line 4—4 in FIG. 2.

Referring now to FIGS. 3 and 4, each of the hub portions of the bearing pintel elements 42 anchor end portions 44 of a pair of helical centering springs 46. The helical springs which are made of an electrically conductive material such as steel, have ends 48 anchored to the tubular housing through threaded terminal screws 50 and electrically connected to connectors 52. The terminal screws 50 are fixedly mounted within the housing assembly by means of a transverse mounting wall 54 internally dividing the tubular housing assembly 12 into a front chamber enclosing the transducer element 36 in its support 32 and a rear chamber enclosing an electromagnetic scanner drive generally referred to by reference numeral 56.

The scanner drive 56 as shown in FIGS. 2 and 3 includes an electromagnetic coil 58 mounted within an annular space formed between an inner tubular core formation 60 and an outer cylindrical housing formation 62 projecting axially from the mounting wall 54. Opposite ends of the electromagnetic coil 58 are connected by terminals 64 and 66 to insulated signal conductors 68 and 70 which extend into the electrical connector plug 28 aforementioned. Electrical current is accordingly supplied to the electromagnetic coil 58 through the conductors 68 and 70 to produce a magnetic field aligned with a longitudinal axis through the inner tubular core formation 60.

As more clearly seen in FIG. 3, the longitudinal axis through the inner tubular core formation 60 of the scanner drive 56, is disposed in axially spaced, offset relation to the end face 72 of a permanent bar magnet 74 fixed to the end wall 34 of the transducer support 32 in a zero position of rest to which it is biased by the helical spring elements 46 aforementioned. Energization of the coil 58 of the scanner drive 56 by flow of current in only one direction will produce a repelling magnetic force acting on the magnetic flux emitting face 72 of the permanent magnet 74 to initially exert a pushing force on the transducer 36 in a counter-clockwise direction, for example, as viewed in FIG. 3 to effect displacement away from the coil face. The offset relationship of pole face 72 to the axis of coil 58 in the zero position, insures such counter-clockwise displacement and enables the data processing system hereinafter described to properly predict and detect the direction of displacement of the transducer.

Displacement of the transducer about the rotational axis of its support through the bearing elements 40 will be limited in opposite angular directions by engagement of the bar magnet 74 with the rubber band stops 30 as the bar magnet 74 is projected through the slot openings 14 of the tubular housing. The opposite biases of the helical springs 46 will tend to return the transducer 36 to its zero position as shown in FIG. 3 and will also establish electrical connections between the transducer element 36 and the insulated electrical conductors 76 and 78 connected to the terminal anchoring screws 50 to which the helical spring elements 46 are connected as aforementioned. The electrical conductors 76 and 78 also extend into the connector plug 28 through which electrical pulses are conducted to the transducer element for emission therefrom of ultrasonic energy and through which return echoes are converted into electrical signal energy conducted to the control system with which the transducer assembly 10 is associated, to be described hereinafter in detail.

Figure 5:
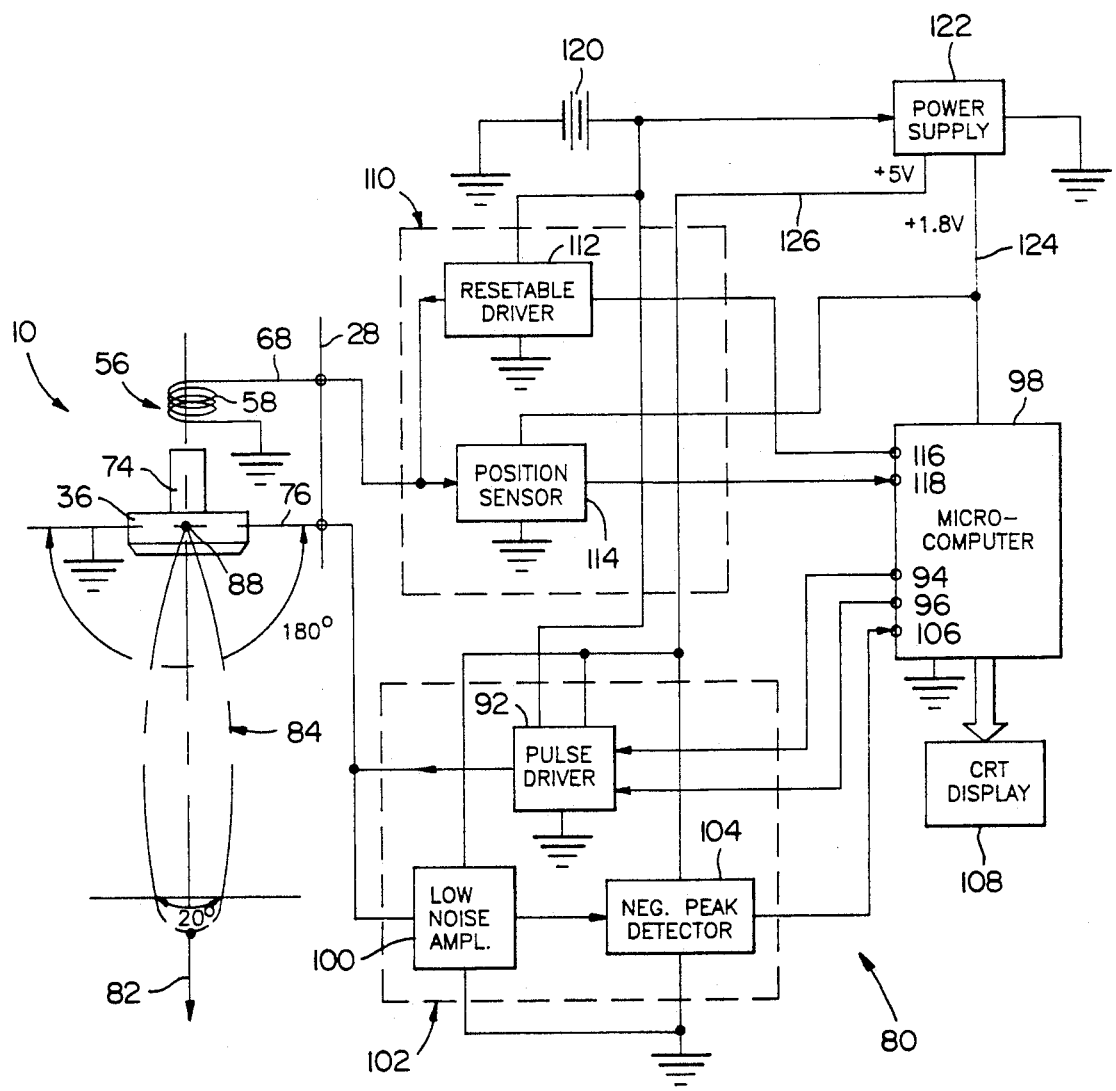
FIG. 5 is a schematic block diagram illustrating the control system associated with the transducer assembly shown in FIGS. 1-4.

Referring now to FIG. 5 in particular, the transducer assembly 10 is shown connected through connector plug 28 to the aforementioned control system generally referred to by reference numeral 80. The transducer element 36 is pulsed through the control system by current conducted thereto through the aforementioned conductor 76 in order to emit ultrasonic energy in one direction denoted by vector 82 within a detection zone denoted by envelope 84. According to one embodiment of the invention, the detection zone envelope is established during an interrogation cycle of approximately 11.36 milliseconds during which any object or target within such detection zone will effectively reflect ultrasonic echo energy to be received by the transducer and converted into electrical energy transmitted through conductor 76 to the control system 80. Also, according to such embodiment of the invention, the detection envelope 84 establishes a detection range distance 86 from its rotational axis 88 of up to approximately seven feet which is maintained substantially fixed in time during each ultrasonic interrogation cycle. Further, the detection envelope 84 illustrated in FIG. 5 has a maximum sector dimension of approximately 20 degrees.

Figure 11:
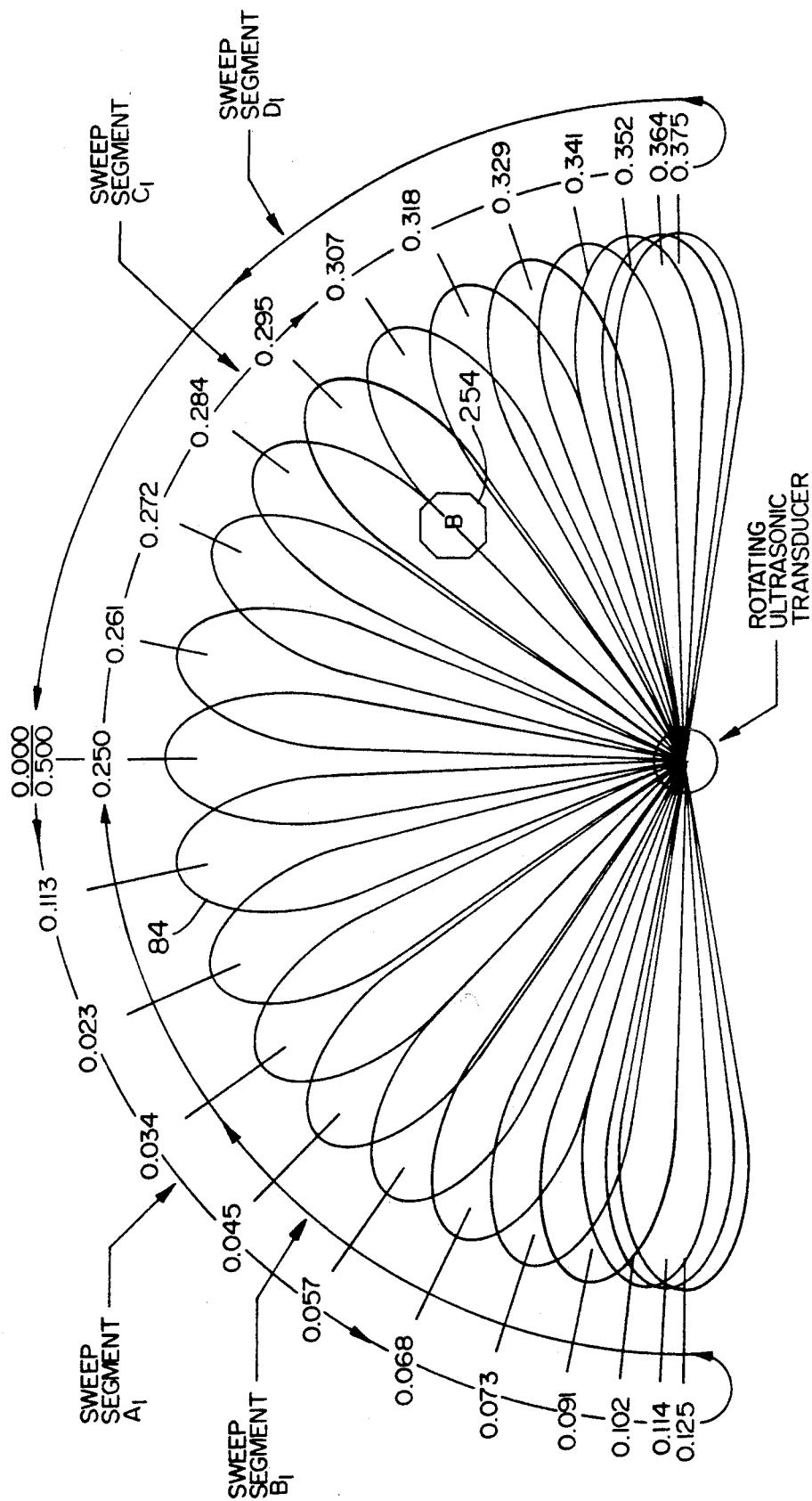
FIG. 11 is a diagram of the detection envelopes established by emission of ultrasonic energy from the transducer in accordance with the arrangement and operations illustrated and diagrammed in FIGS. 1-10.

With continued reference to FIG. 5, the transducer element 36 scans a detection zone substantially greater than that encompassed by a single detection envelope 84 by displacement of the transducer element 36 about its rotational axis 88 through a sweep angle of less than 360 degrees, such as 180 degrees as shown. Such scanning movement of the transducer is effected by angular displacement in opposite directions by 90 degrees from the zero position shown in FIG. 5, in response to pulsing of the electromagnetic coil 58 of the drive 56 as aforementioned. FIG. 11 diagrams the detection envelope 84 at a plurality of sweep angle positions to which it is displaced corresponding to the beginning of each interrogation cycle characterized by a pulse applied to the transducer of approximately 250 microseconds duration. Electrical drive pulses applied to the coil 58 are varied in magnitude and timing to achieve and maintain the desired operational relationships between transducer emission and position in response to detection of the zero position of the transducer and its sweep angle end positions limited by engagement with the rubber band stop elements 30. Pulsing of the transducer element 36 to effect emission therefrom of ultrasonic energy is achieved through conductor 76, the electrically conductive centering spring elements 46 and a pulse driver 92 in a transmit-receive circuit 102 under control of pulse producing signals and gating signals applied thereto from signal output ports 94 and 96 of a microcomputer 98. Echo signals derived from the transducer element as a result of reflections from objects within the detection zone, are also transmitted through the helical springs elements 46 and conductor 76 to a noise amplifier 100 in the transmit-receive circuit 102. The amplified echo signals are fed to a negative peak detector 104 of the transmit-receive circuit from which an output is applied to an input port 106 of the microcomputer 98. The signal data received through input port 106 of the microcomputer is utilized to analyze target objects from which echoes are reflected and perform other functions, in accordance with programming algorithms, including the display of information regarding the distance and nature of the detected target on a display 108. Such analysis of the echo signals by the microcomputer is of course dependent upon its time relationship to the pulsing of the electromagnetic coil 58 and detection of the zero and limit positions of the transducer during its scanning displacement as aforementioned. Displacement of the transducer and detection of the positions thereof is achieved through a scanning drive and sensor component 110 as diagrammed in FIG. 5. Component 110 includes a resettable driver circuit 112 and a position sensing circuit 114. The electromagnetic coil 58 is connected to through the resettable driver circuit 112 and the aforementioned conductor 68 to a pulse signal output port 116 of the microcomputer. The transducer position signals are detected by the position sensing circuit 114 also connected to coil 58 through conductor 68. The position sensing circuit 114 is connected to a position signal input port 118 of the microcomputer.

The control system 80 further includes a source of power in the form of a battery 120, the positive voltage terminal of which is connected to the resettable driver circuit 112, the pulse driver 92 and to a voltage regulator 122. The voltage regulator 122 provides two output voltages of different levels including a 1.8 volt reference bias in line 124 connected to the microcomputer 98 and position sensor 114 and a positive 5 volt supply in line 126 connected to the pulse driver 92, the low noise amplifier 100 and the negative peak detector 104 for operative powering thereof. The bias line 124 establishes a reference above ground with respect to AC signals within the microcomputer 98.

Figure 6:
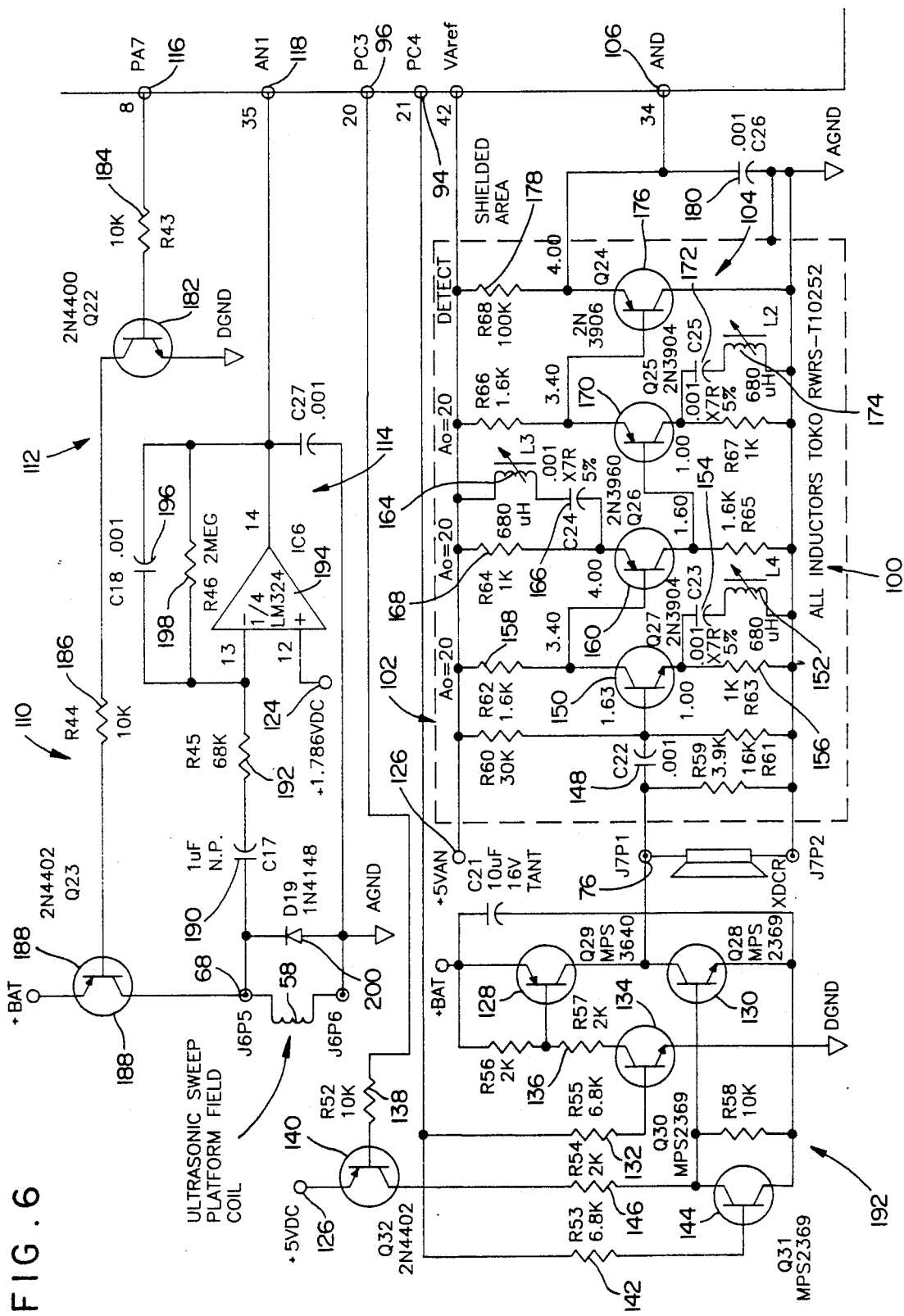
FIG. 6 is a more detailed circuit diagram of some of the components diagrammed in FIG. 5.

The circuitry associated with the transmit-receive circuit 102 is shown in greater detail in FIG. 6. The pulse driver 92 includes a pair of series connected transistors 128 and 130 interconnected between ground and the positive battery terminal to apply a pulse output from their interconnected collectors to the transducer element 36 through conductor 76 as shown, when a signal input of 200 KHz frequency from output port 94 of the microcomputer is applied through resistor 132 to the base of transistor 134 in order to apply a control bias through resistor 136 to the base of transistor 128. The output from the interconnected collectors of transistors 128 and 130 is gated by the gating signal applied from port 96 through resistor 138 to the base of gating control transistor 140 causing it to switch on periodically and apply base bias to the base of transistor 130 to render it conductive. The pulse input signal at port 94 aforementioned, is also applied through resistor 142 to the base of control transistor 144, the collector of which is connected to the juncture between resistor 146 and the base of transistor 130 having an emitter connected to ground in common with the emitters of transistors 130 and 134.

The echo signals detected by the ultrasonic transducer 36 are applied through conductor 76 and capacitor 148 to the base of transistor 150 in the low noise amplifier 100, tuned to high gain and low noise by grounded adjustable inductor 152 connected by capacitor 154 to the emitter of transistor 150 maintained above ground level by resistor 156. The output collector of transistor 150, to which bias voltage is applied from the 5 volt source 126 through resistor 158, is applied to the base of transistor 162, tuned by means of adjustable inductor 164 connected by capacitor 166 to its emitter to which a positive voltage bias is applied from the voltage source 126 through resistor 168. Further tuning is achieved by the output at the collector of transistor 16 being applied to the base of transistor 170, the emitter of which is connected through capacitor 172 to a grounded adjustable inductor 174 to establish a Q of approximately 20 for the low noise amplifier 100, with a gain of approximately 100,000 at ultrasonic frequencies. The amplified and filtered signal output at the collector of transistor 170 is applied to the base of transistor 176 forming a simple negative peak detector and filter in combination with its emitter biasing resistor 178 and grounded capacitor 180. The output of transistor 176 at its emitter is connected to the aforementioned signal-input port 106 of the microcomputer 98 for analog-to-digital conversion and analysis. Such incoming ultrasonic reflection signals are scanned by the microcomputer every 138 microseconds and is thereby translated into an effective one-way distance resolution of about three inches.

With continued reference to FIGS. 5 and 6, the resettable driver circuit 112 includes transistor 182, the base of which is connected by resistor 184 to the pulse driving output port 116 of the microcomputer. The output collector of transistor 182 is connected through resistor 186 to the base of power transistor 188 causing it to switch on and conduct current from the battery terminal to the input terminal of the coil 58 through the conductor 68 as aforementioned.

The terminal of coil 58 is also coupled through series connected capacitor 190 and resistor 192 to the negative input terminal of operational amplifier 194 of the position sensing circuit 114. The positive reference terminal of amplifier 194 is connected to the bias voltage line 124. Feedback for the operational amplifier is established by parallel connected feedback capacitor 196 and resistor 198 to detect signals from the coil 58, bandpass filter it and amplify it 30 times. A diode 200 interconnecting the conductor 68 from the coil 58 to ground prevents inductive kickback voltages from destroying transistor 188 of the driver once the coil is deenergized.

Figure 7:
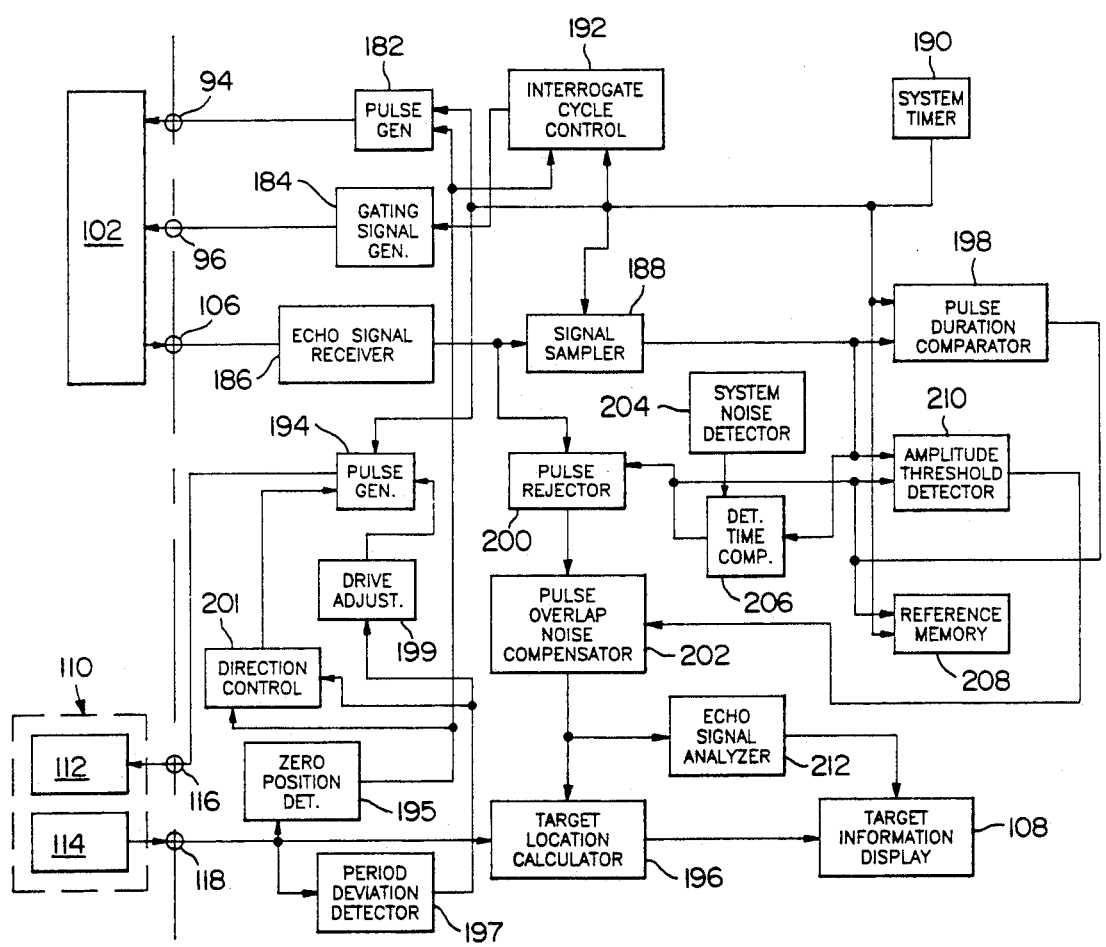
FIG. 7 is a functional block diagram illustrating the operational features associated with the microcomputer diagrammed in FIG. 5.

The microcomputer 98 interfaced with the transducer assembly 10 through the transmit-receive circuit 102 and the drive/sensor component 110, as hereinbefore described with respect to FIGS. 5 and 6, controls and interrelates operation of such components and performs various data analyzing functions as diagrammed in FIG. 7. Thus, the transducer pulse signals at the signal output port 94 of the computer are generated at 182 simultaneously with the generation of gating signals at 184 supplied to port 96. The returning echo signals supplied by transmit-receive circuit 102 to the computer port 106, is fed to an echo signal receiver 186 from which the echo signals are sampled at 188 for subsequent analysis. A system timer 190 interrelates with respect to time operation of the pulse generator 182, signal sampler 188 and an interrogation cycle control 192 through which generation of gating signals at 184 is controllably timed to gate the driving pulses for the transducer as aforementioned. The system timer also times operation of the drive pulse generator 194 through which pulses are supplied to the output port 116 of the computer for supply of signals to the resettable driver circuit 112. Position sensing signals derived from the position sensor 114 with respect to the zero position of the transducer as aforementioned, is accordingly fed from port 118 to a zero position detector 195, a wave-form period deviation detector 197 and a calculator 196 for calculation of the actual physical placement characteristics of the target object relative to the current position of the transducer. The calculator 196 also receives an input of echo signal information as shown in FIG. 7.

The echo signal information is extracted by the computer from the echo signal receiver 186 to avoid signal error. Thus, the output of the signal sampler 188 is applied to a pulse duration comparator 198 to which the system timer 190 is connected in order to limit the extracted information to echo pulses of a predetermined duration representing valid data. The output of the comparator 198 is accordingly applied to a pulse rejector 200 through which invalid echo pulses are removed before such echo pulses are transmitted to a pulse overlap and noise compensator 202. The pulse rejector also removes signal pulses arising because of system noise sensed by the detector 204 and applied to comparator 206 for comparison with the sampled echo signal output of sampler 188. The output of the pulse duration comparator 198 is also applied to a reference memory 208 in parallel with the output of the system timer and to a pulse amplitude threshold detector 210 to which the sampled echo signal output is also applied. The output of the pulse amplitude threshold detector 210 enables the pulse overlap and noise compensator 202 aforementioned, in order to complete the extraction of invalid echo information from the data supplied to the target location calculator 196 aforementioned, and from its calculated output through an echo signal analyzer 212. The outputs of the calculator 196 and the analyzer 212 will accordingly provide information as to the location and nature of the target which may be read out on the target information display 108 aforementioned.

In order to maintain constant oscillation of the transducer through its sweep angle, operation of the pulse generator 194 is controlled by drive adjuster 199 and directional control 201. Drive adjuster 199 varies the duration of the pulses generated in accordance with deviations in the period of the coil waveform reflected by output signals from detector 197. Operation of directional control 201 on the other hand is determined by outputs from both detectors 195 and 197.

Figure 8:
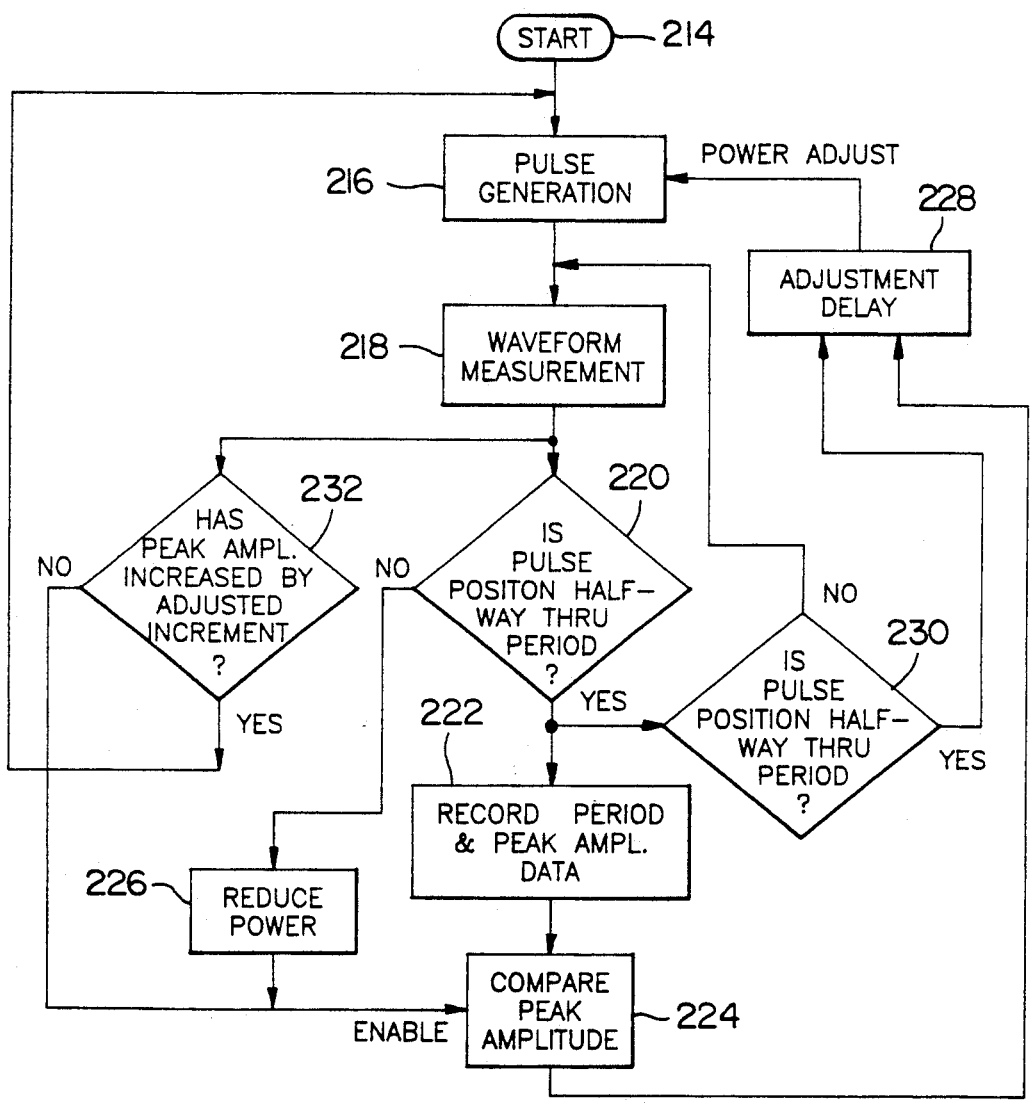
FIG. 8 is a flow chart diagramming the scanner drive program associated with the microcomputer depicted in FIG. 5.

In order to perform the functions hereinbefore diagrammed in FIG. 7, the computer 98 is programmed in connection with the scanning drive operations performed through the electromagnetic drive 56 and the driver/sensor component 110 interfaced therewith in accordance with a program 238 as diagrammed in the flow chart of FIG. 8.

As hereinbefore indicated, the transducer element 36 under computer control is forced to oscillate about the vertical axis 88, as depicted in FIG. 5, in order to detect any objects within a hemispheric zone having a range of approximately seven feet. Toward that end, the computer 98 is programmed to begin a scanning sweep of the transducer element from a zero angle position of the vector 82 in FIG. 5 in opposite directions. Initiation of such displacement of the transducer element is indicated at start 214 in the program flow chart of FIG. 8. Drive pulses of variable duration are generated, as indicated at 216 in FIG. 8, through the transducer pulse generator 194 as aforementioned in connection with FIG. 7 resulting in the pulsing of the electromagnetic coil 58 as hereinbefore described. Measurement of the field coil waveform produced by the electromagnetic coil 58, indicated at 218 with respect to period and peak amplitude, is performed through signals produced by the position sensing circuit 114 as hereinbefore described supplied to the port 118 of the computer. From the analysis of such waveform measurements performed by the computer through detectors 195 and 197, the sweep period is monitored so that when it is equal to or greater than a predetermined value $P_1$ as indicated in the decision block 220 of FIG. 8, the computer stores the period and peak amplitude data of such waveform measurement as indicated at 222 in FIG. 8. Time spaced peak amplitude data recorded by the computer is compared as indicated at 224 in order to effect adjustment through adjuster 199 of drive pulse generation as indicated at 216. Such adjustments are made in order to establish and maintain a constant oscillation of the transducer through the 180° arc in accordance with the embodiment of the invention as hereinbefore described. Accordingly, if the sweep period as determined at decision block 220 is greater than the predetermined value $P_1$, a reduction in power is effected by a delay operation 228 when enabled by the peak amplitude comparison operation 224. Such power adjustment by the delay operation 228 is effected by the timing of drive pulse generation at 216 which is thereby regulated for power adjustment purposes as indicated in FIG. 8. A delay operation 226 also adjusts the timing for the drive pulse, provided the sweep period of the measured coil waveform is equal to or greater than the value $P_1$ as indicated at decision block 220, when the drive pulse is halfway through a sweep period as indicated at decision block 230. In the event that the drive pulse is not at the halfway location through the sweep period, the measurement process is repeated.

It will be appreciated that once oscillatory movement of the transducer element has begun, there will be some delay before the desired motion through the 180° arc is attained. If the peak amplitude of the waveform is increased by the proper adjusted increment, as denoted at decision block 232 in FIG. 8, generation of drive pulses is continued. Otherwise, power adjustment operation is enabled.

Figure 9:
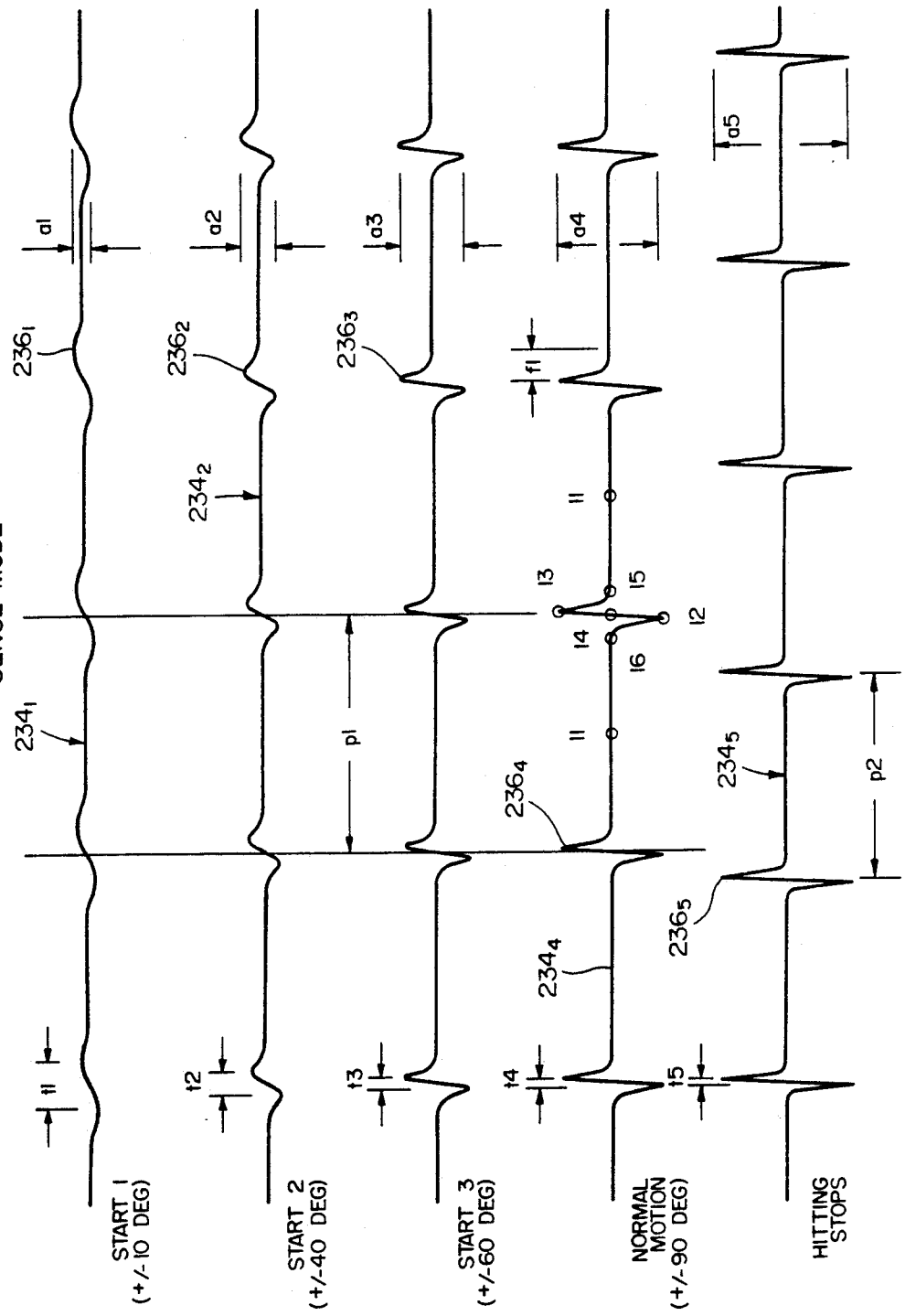
FIG. 9 is a graphical diagram of the signal characteristics of the voltages associated with operation of the scanner drive illustrated in FIGS. 5 and 6 in accordance with the program diagrammed in FIG. 8.

FIG. 9 graphically illustrates beginning of oscillatory movement imparted to the transducer element as reflected by a typical coil waveform $234_1$ having relatively low amplitude peak portions $236_1$ as measured for example when the transducer element undergoes 10° displacement from the zero angle position in accordance with one embodiment of the invention. When the transducer element reaches a 40° position, the peak portions $236_2$ of the waveform $234_2$ has increased. Also, the duration of the pulse $236_2$ has decreased from $t_1$ to $t_2$ as shown. At the 60° position of the transducer element, the amplitude of the peak pulse portion $236_3$ has further increased with a further reduction in the pulse duration to $t_3$. When normal motion is achieved at the 90° position of the transducer element, the peak pulses $236_4$ of the waveform $234_4$ have achieved maximum amplitude and minimum duration $t_4$. The periods of the waveform during movement of the transducer between the limit positions of 90° from the zero position in either direction as detected by the position sensing circuit remains substantially constant at $P_1$ as shown in FIG. 9. In the event there is any tendency for the transducer element to be displaced beyond its limit positions, the permanent magnet element 74 engages the rubber band stops 30 as aforementioned causing a reduction in the waveform period to a value $P_2$ as indicated with respect to the waveform curve $234_5$ which is also characterized by a further reduction in the pulse duration $t_5$ and a further increase in amplitude of the pulse peaks $236_5$. Normal motion of the transducer element will be restored and thereafter maintained as a result of the detection of the zero angle position of the transducer element and the effect of the contact made with the rubber band stops at the sweep angle limit positions of the transducer element under computer control in accordance with the sweep drive program 238 hereinbefore described with respect to FIG. 8.

When the transducer approaches or departs from its zero angle position, energization of the coil 58 by a drive pulse swamps the position sensor 114 to momentarily disable its operation. Because of the offset between the pole face 72 and the axis of coil 58 in the zero angle position of the transducer, as aforementioned, and the momentary disablement of position sensor 114 the waveform period measurement is either lengthened or shortened by a small amount depending on the direction of the magnetic displacing force applied or the coil energizing current. The computer 98 is thereby able to predict through detectors 195 and 197 the direction in which the transducer will be displaced from its zero angle position to directionally control pulse generation at such zero position as hereinbefore referred to in connection with the functional diagram of FIG. 7.

Figure 10:
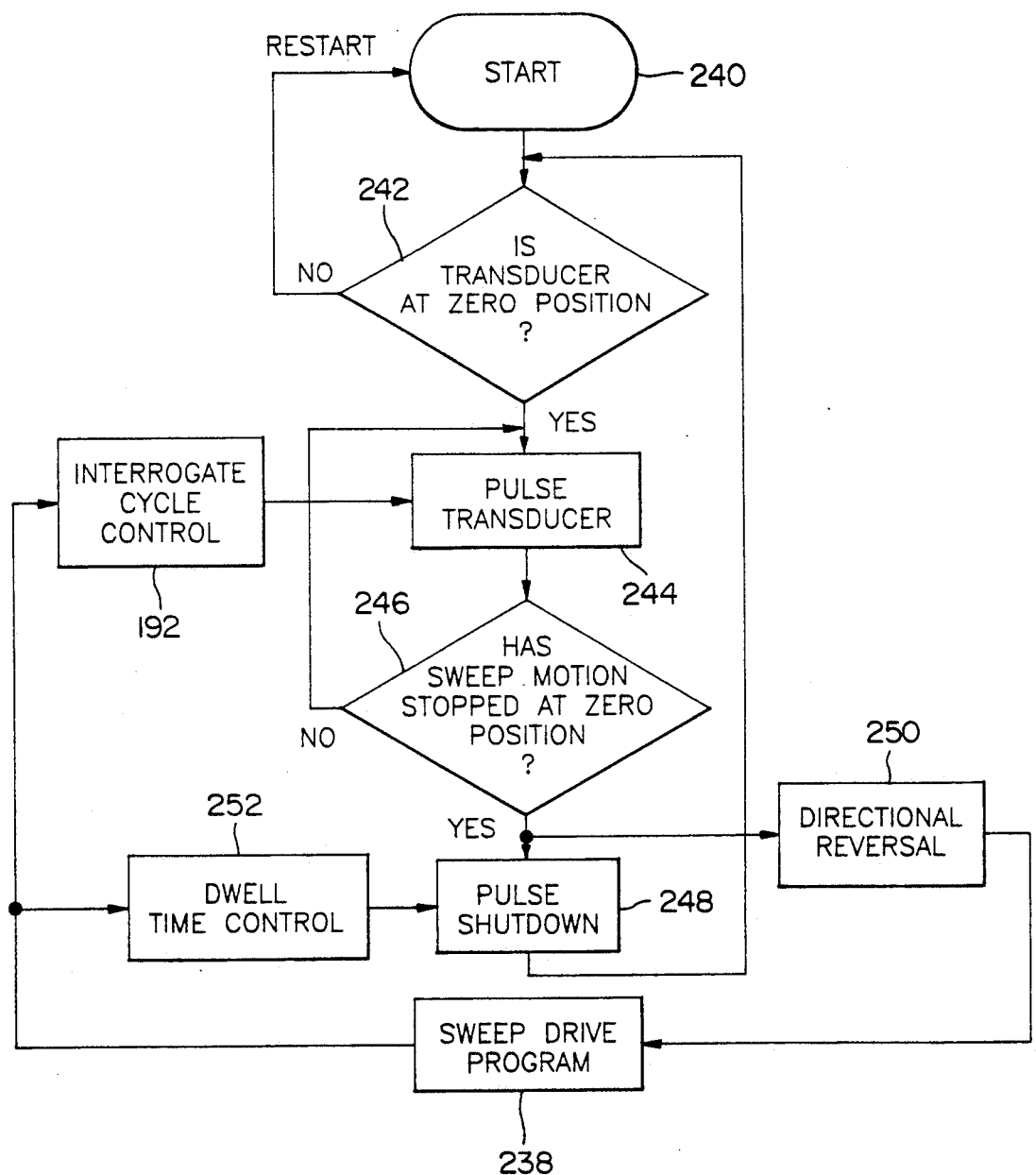
FIG. 10 is a flow chart of the transducer pulse timing program associated with operation of the transducer in relation to the scanning drive operation.

FIG. 10 is a program flow chart depicting the transducer pulse timing program coordinated with the sweep drive program 238 in order to effect proper pulsing of the transducer element for emission therefrom of the ultrasonic energy as hereinbefore described. As shown in FIG. 10, the timing program begins with start 240 occasioned by the sensing of the position of the transducer element through the pulse position sensing circuit 114 and detector 195 as aforementioned. If the transducer is determined to be at the zero position as indicated by decision block 242 in FIG. 10, the transducer element is pulsed as indicated by operation 244. When the motion of the transducer element has stopped, as indicated at decision block 246, pulse generation is shut down as indicated at 248 and the process repeated. If the motion of the transducer element has not stopped, another pulse is applied as indicated at decision block 246.

With the shutdown of pulse generation when motion of the transducer element stops at its zero angle position, a directional reversal of motion is effected through directional control 201 as indicated at 250 in FIG. 10 initiating the sweep drive program 238 as aforementioned. Such program is coordinated with the interrogation cycle time control 192 and a dwell period time control 252 in order to respectively regulate timing of the pulsing operation 244 and pulse shutdown operation 248 in order to coordinate the transducer pulsing process with that of the sweep drive program.

As a result of the computer control program imposed on the pulsing of the transducer element and its motion under control of the electromagnetic drive 56, a detection envelope pattern is established as illustrated in FIG. 11 hereinbefore referred to. The location of any object 254 within the zone covered by the detection envelopes 84 in the various angular positions as shown in FIG. 11, will produce echo reflections from target objects by means of which the location and nature of such object or target is determined by analysis of the echo signals received and transmitted to the computer as hereinbefore described with respect to FIG. 7.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In a remote target detection system having a single transducer through which energy conversions occur, transmit-receive means for periodic generation and reception of signal energy converted by the transducer and scanning drive means operatively connected to the transducer for scanning displacement thereof through a sweep angle of less than 360°, the improvement including centering means for biasing the transducer to a zero position of rest from which the transducer is displaced by the scanning drive means and terminal means electrically interconnecting the transducer and the transmit-receive means through the centering means for effective emission and reception of the signal energy by the transducer during said scanning displacement thereof with minimized noise generation.

2. The improvement as defined in claim 1 wherein said scanning drive means includes electromagnetic coil means for magnetically imparting displacing forces to the transducer and pulse generating means connected to the electromagnetic coil means for producing said displacing forces.

3. The improvement as defined in claim 2 wherein said scanning drive means further includes an armature connected to the transducer in spaced offset relation to the electromagnetic coil means in the zero position of the transducer, said displacing forces being magnetically applied in opposite directions to the armature.

4. The improvement as defined in claim 3 including stop means for limiting said scanning displacement of the transducer from the zero position to said sweep angle.

5. The improvement as defined in claim 4 including position sensing means connected to the electromagnetic coil means for detecting engagement of the stop means and arrival of the transducer at the zero position during said scanning displacement thereof and adjustable means for controllably varying the displacing forces in magnitude and phase to maintain said scanning displacement of the transducer through said sweep angle in response to said detection of the zero position and engagement of the stop means.

6. The improvement as defined in claim 5 including pulse control means connected to the transmit-receive means for regulating said periodic generation of the signal energy in timed relation to said scanning displacement of the transducer.

7. The improvement as defined in claim 2 including stop means for limiting said scanning displacement of the transducer from the zero position to said sweep angle.

8. The improvement as defined in claim 7 including position sensing means connected to the electromagnetic coil means for detecting arrival of the transducer at the zero position during said scanning displacement thereof and adjustable means for controllably varying the displacing forces in magnitude and phase to maintain said scanning displacement of the transducer through the sweep angle in response to said detection of the zero position and engagement of the stop means.

9. The improvement as defined in claim 1 including pulse control means connected to the transmit-receive means for regulating said periodic generation of the signal energy in timed relation to said scanning displacement of the transducer.

10. The improvement as defined in claim 1 including stop means for limiting said scanning displacement of the transducer from the zero position to a said sweep angle.

11. The improvement as defined in claim 10 including position sensing means connected to the scanning drive means for detecting arrival of the transducer at the zero position during said scanning displacement thereof and adjustable means for controllably varying the displacing forces in magnitude and phase to maintain said scanning displacement of the transducer through the predetermined sweep angle in response to said detection of the zero position and engagement of the stop means.

12. In a remote target detection system having a transducer through which energy conversions occur, transmit-receive means for periodically generating and receiving signal energy converted by the transducer and scanning drive means operatively connected to the transducer for scanning displacement thereof, the improvement including stop means for limiting said scanning displacement of the transducer from a zero position to a predetermined sweep angle, position sensing means connected to the scanning drive means for detecting engagement of the stop means and arrival of the transducer at the zero position during said scanning displacement thereof and adjustable means controllably varying the displacing forces in magnitude and timed relation to said detection of the zero position and engagement of the stop means for maintaining said scanning displacement of the transducer through the predetermined sweep angle substantially constant.

13. The improvement as defined in claim 12 including pulse control means connected to the transmit-receive means for regulating said periodic generation of the signal energy in timed relation to said scanning displacement of the transducer.

14. In a remote target detection system having a transducer through which energy conversions occur, transmit-receive means for periodically generating and receiving signal energy converted by the transducer and scanning drive means operatively connected to the transducer for scanning displacement thereof, the improvement including sensing means connected to the scanning drive means for detecting relatively abrupt changes in motion of the transducer and pulse control means operatively connected to the sensing means for varying said periodic generation of the signal energy by the transmit-receive means in timed relation to said scanning displacement of the transducer in response to detection of the abrupt changes in motion by said sensing means.

15. The improvement as defined in claim 14 wherein said scanning drive means includes electromagnetic coil means for magnetically imparting displacing forces to the transducer and pulse generating means connected to the electromagnetic coil means for producing said displacing forces.

16. The improvement as defined in claim 15 wherein said scanning drive means further includes an armature connected to the transducer in spaced offset relation to the electromagnetic coil means in a zero position of the transducer, said displacing forces being magnetically applied in opposite directions to the armature.

17. In a remote target detection system having a transducer through which energy conversions occur, transmit-receive means for periodically generating and receiving signal energy converted by the transducer, the improvement including centering means for biasing the transducer to a zero position of rest from which the transducer is displaced by the scanning drive means and terminal means electrically interconnecting the transducer and the transmit-receive means through the centering means for effecting emission of the signal energy and reception of echoes thereof by the transducer during scanning displacement with minimized noise generation.

18. The improvement as defined in claim 17 wherein said centering means comprises a pair of spring elements anchored by the terminal means, a support connected to the spring elements on which the transducer is fixedly mounted and bearing means for establishing a rotational axis about which the support is displaceable with the transducer against the bias of the centering means, said spring elements being made of electrically conductive material.

19. The improvement as defined in claim 18 including electromagnetic means for magnetically imparting displacing forces to the transducer to effect said scanning displacement thereof and pulse generating means connected to the electromagnetic means for producing said displacing forces.

20. The improvement as defined in claim 19 including armature means connected to the transducer support in spaced, offset relation to the electromagnetic means for establishing said zero position from which said scanning displacement is imparted to the transducer in opposite directions by said displacing forces.

21. In a remote target detection system having a transducer through which signal energy is converted and scanning drive means operatively connected to the transducer for scanning displacement thereof from a zero position, said scanning drive means comprising a single electromagnetic coil, an armature having a magnetic pole face and pulse generating means connected to the coil for periodic energization thereof, the improvement residing in means mounting the armature on the transducer for alignment of the pole face in offset relation to the coil in said zero position of the transducer and sensing means operatively connected to the electromagnetic coil for waveform measurement during said periodic energization thereof to detect abrupt changes in the motion of the transducer and to detect the position of the scanning drive means to prevent the transducer from travelling past preset mechanical limits.

22. In a remote target detection system having a transducer through which signal energy is converted and scanning drive means operatively connected to the transducer for scanning displacement thereof from a zero position, said scanning drive means comprising a single electromagnetic coil, an armature having a magnetic pole face and pulse generating means connected to the coil for periodic energization thereof, the improvement residing in means mounting the armature on the transducer for alignment of the pole face in offset relation to the coil in said zero position of the transducer and sensing means operatively connected to the electromagnetic coil for waveform measurement during said periodic energization thereof to detect abrupt changes in the motion of the transducer, data monitoring means operatively connected to the sensing means for detecting deviations in period of the waveform measurement while the transudicer is substantially at said zero position thereof and control means operatively connecting said data monitoring means to the pulse generating means for directionally controlling current conducted through the coil in response to said detection of the deviations in the period of the waveform measurement.

23. The improvement of claims 14, wherein said sensing means detects the position of the scanning drive means to prevent the transducer from travelling past preset mechanical limits.

24. In a remote target detection system having a transducer through which signal energy is converted and scanning drive means operatively connected to the transducer for scanning displacement thereof from a zero position, said scanning drive means including an electromagnetic coil, an armature having a magnetic pole face and pulse generating means connected to the coil for periodic energization thereof, the improvement residing in means mounting the armature on the transducer for alignment of the pole face in offset relation to the coil in said zero position of the transducer, sensing means operatively connected to the coil for waveform measurement during said periodic energization thereof, data monitoring means operatively connected to the sensing means for detecting deviations in period of the waveform measurement while the transducer is substantially at said zero position thereof and control means operatively connected said data monitoring means to the pulse generating means for directionally controlling current conducted through the coil in response to said detection of the deviations in the period of the waveform measurement.

* * * * *